United States Patent
Ebner et al.

(10) Patent No.: US 7,062,100 B2
(45) Date of Patent: Jun. 13, 2006

(54) SYSTEM FOR SELECTING A COMPRESSION METHOD FOR IMAGE DATA

(75) Inventors: Fritz F. Ebner, Redwood City, CA (US); Daniel Davies, Palo Alto, CA (US); Edward E. Ewer, Fairport, NY (US); Ramesh Nagarajan, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 784 days.

(21) Appl. No.: 10/320,810

(22) Filed: Dec. 16, 2002

(65) Prior Publication Data

US 2004/0114195 A1 Jun. 17, 2004

(51) Int. Cl.
G06K 9/36 (2006.01)
(52) U.S. Cl. .................. 382/243; 382/257; 382/308
(58) Field of Classification Search ............... 382/243, 382/232, 233, 237–240, 244–251, 257, 308, 382/205, 192, 195; 358/1.1, 1.6–1.9, 1.15, 358/426.01–426.07, 426.13–426.16; 375/240, 375/240.08, 240.12
See application file for complete search history.

(56) References Cited

U.S. PATENT DOCUMENTS

| 4,555,802 A | * | 11/1985 | Fedak et al. ................ 382/243 |
| 5,854,857 A | * | 12/1998 | de Queiroz et al. ........ 382/232 |
| 5,991,515 A | | 11/1999 | Fall et al. .................. 358/1.15 |
| 6,337,747 B1 | | 1/2002 | Rosenthal .................. 358/1.15 |

* cited by examiner

Primary Examiner—Ishrat Sherali
(74) Attorney, Agent, or Firm—R. Hutter

(57) ABSTRACT

In an image-data processing system, as would be found in a digital copier or scanner, a relatively quick calculation is performed to estimate a compression ratio or compression time resulting from applying a compression algorithm to an image data set. If the estimated compression ratio or compression time is determined to be unfavorable, the system is advised not to apply the compression algorithm. The method can also be used to select a type of compression algorithm, such as CCITT G4 or JBIG2, according to the requirements of the larger system.

14 Claims, 3 Drawing Sheets

SYSTEM FOR SELECTING A COMPRESSION METHOD FOR IMAGE DATA

TECHNICAL FIELD

The present invention relates to a system for selecting the compression method for image data, as would be useful in facsimile machines and digital printing, scanning and copying systems.

BACKGROUND

Compression of image data, such as using CCITT G4 binary lossless coding, is common in the context of systems which handle document or image data, such as facsimile machines and digital printing, scanning and copying systems. Whenever raw image data is scanned from an original image, the raw data is typically immediately compressed using a lossless algorithm. Also, when data representative of an image desired to be printed is submitted to a digital printing apparatus, after it is decomposed, the data is typically temporarily re-compressed and retained in memory until a specific page image is required by the printer hardware (e.g., an ink-jet printhead or a modulator in an electrophotographic "laser printer"), at which point it is decompressed and used to operate the printer hardware. And when digital images are exported to the network, they are also typically compressed to reduce the bandwidth used during the transfer.

In certain situations, however, image data sets subjected to well-known compression algorithms will not in fact be compressed to a smaller size; rather, the "compressed" image resulting from application of the algorithm will be larger than the original image data set. In CCITT G4 compression, such a result is likely to occur when the original image to be compressed includes a large number of isolated dots. Such isolated dots tend to result when a mid-tone gray image is converted, earlier in the image's life cycle, to a halftone image with error diffusion or blue noise. It is, therefore, desirable to be able to predict, before a compression technique is applied to an image data set, whether the compression technique will in fact appreciably reduce the size of the data set. If it can be reliably predicted that the compression technique will not appreciably reduce the size of the data set, then the larger system can determine that the image data set should not be submitted to the compression technique.

Another factor in the performance of a digital image-processing system is the time of compressing the image data. Generally, a favorably high compression ratio correlates with a relatively short time required for the compression algorithm to compress the image data. Different kinds of compression techniques may present trade-offs between the resulting compression ratio and the time required to carry out the compression: for example, in many cases, a JBIG2 compression will result in a smaller compressed file than would result from CCITT G4 compression, although the JBIG2 compression often requires more time.

DESCRIPTION OF THE PRIOR ART

U.S. Pat. No. 5,991,515 describes a system for predicting compression ratios of images which include multiple objects of different types, such as text, graphics and halftones.

U.S. Pat. No. 6,337,747 describes a system for predicting a final compression ratio of an image in process of being subjected to a compression algorithm.

SUMMARY OF THE INVENTION

According to an aspect of the present invention there is provided a method of analyzing an image data set. A number of on-pixels in the image data set is determined. A morphological operation is performed on the image data set, yielding a processed image data set including processed on-pixels. A metric is derived from a relationship between a number of on-pixels in the image data set and a number of processed on-pixels in the processed image data set. The metric is used to estimate a compression performance associated with the image data set.

DETAILED DESCRIPTION

Figure 1:
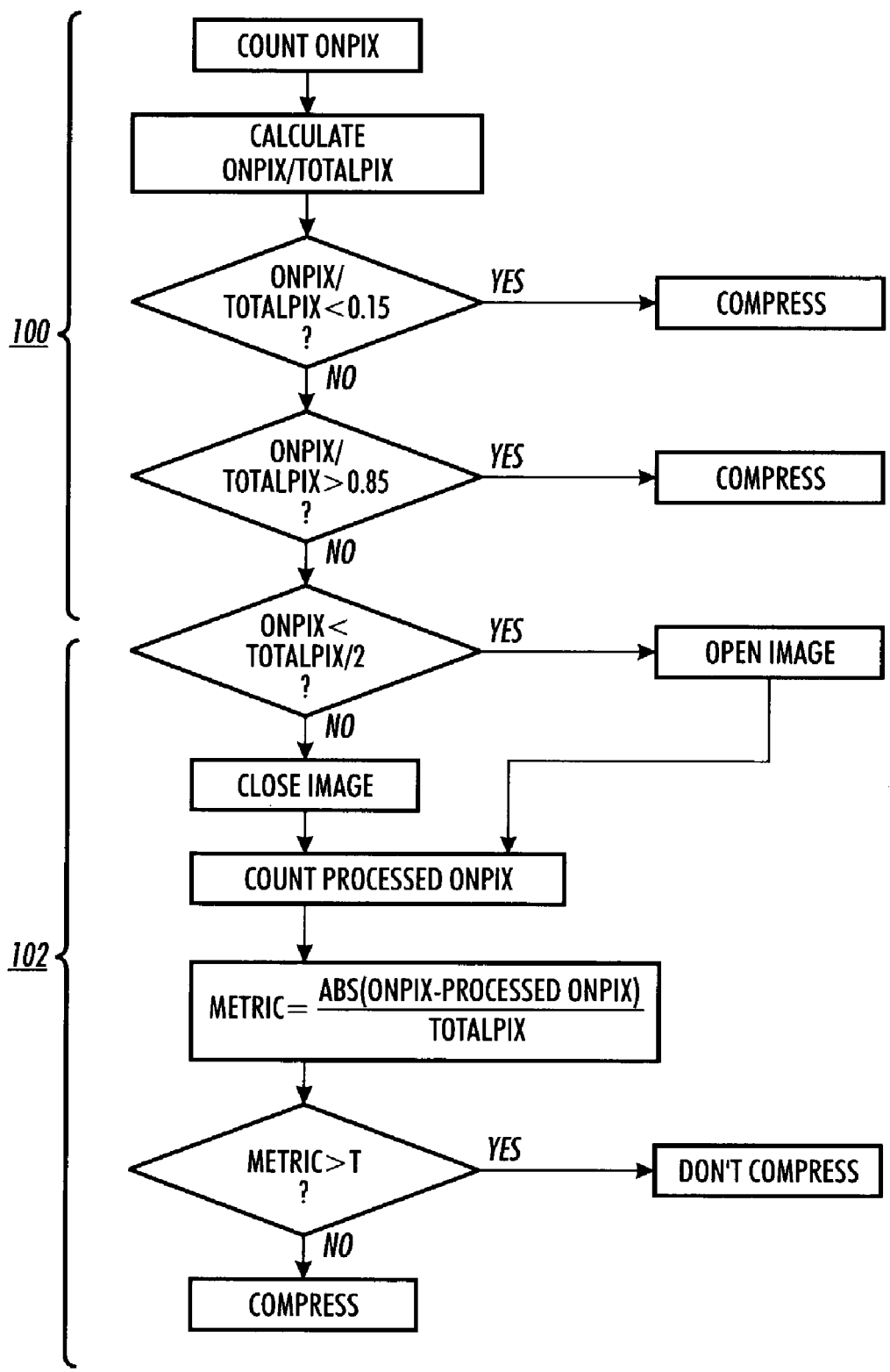
FIG. 1 is a flow-chart of a method for analyzing an image data set.

FIG. 1 is a flow-chart of a method for analyzing an input image data set when it is subjected to a type of compression algorithm, particularly CCITT G4 or JBIG2, although the basic method shown could be adapted to predict the behavior of other well-known compression algorithms. The method of FIG. 1 takes as an input the data set, in binary form, for the image which may be compressed; the data is in binary form, typically with black (or whatever color) pixels assigned a 1 and white pixels assigned a 0. The data set could represent a single page image, multiple page images, or a segment of a page image, such as a text or halftone portion thereof. The output of the method is a decision whether the input data set will be sufficiently reduced in size by the compression algorithm, and therefore whether the data set should be subjected to the compression algorithm as part of a larger image-processing process (compress) or not be subjected to the compression algorithm (don't compress). (As mentioned above, in most cases, a high compression ratio correlates with a short compression time; as used herein, the phrase "compression performance" can relate to either the compression ratio or compression time.) Of course, in a practical implementation, the calculations associated with FIG. 1 or other embodiments will be undertaken on the image data set in a much shorter time than would be required to subject the data set to the compression algorithm.

The embodiment of FIG. 1 comprises two general stages, indicated as 100 and 102. In the first stage 100, the number of 1 bits in the binary image data set, here called on-pixels or ONPIX, is counted relative to the total number of pixels in the data set. If the proportion of ONPIX is fairly high or low, such as less than 0.15 or more than 0.85, compression is immediately mandated, as shown. If the proportion of ONPIX is within a middle range, a second-stage decision process is undertaken. (The proportions of ONPIX shown in the embodiment are examples only, and may be different in other implementations.)

In the second stage 102, morphological operations, such as closing and opening, are performed on the image data set: typically, these operations require significantly less time than subjecting the data set to the compression algorithm. First, it is checked whether the pixels in the data set (TOTALPIX) are mostly ONPIX; if ONPIX<TOTALPIX/2, the image data set is dilated; if not, the image data set is closed. Definitions of these operations are well known in the art. Following the morphological operations, a new data set results, with a new number of on-pixels, here called PROCESSEDONPIX to distinguish it from the ONPIX in the original data set. Some morphological operations, such as closure, tend to result in an increase of on-pixels while other morphological operations result in a decrease. In the present embodiment, a METRIC is defined as an absolute difference between ONPIX and PROCESSEDONPIX as a proportion of the TOTALPIX in the data set. As shown, if this METRIC is above a certain threshold T, it is recommended that the original data set is not subjected to the compression algorithm; if the METRIC is below T, then subjecting the image data to the compression algorithm is likely to achieve the desirable result of a sufficiently high compression ratio.

The exact value of T for making the decision is an engineering choice, affected by other considerations within a larger system, such as the amount of available memory for retaining the compressed (or not compressed) image data, speed requirements of the system, rendering algorithm used to create the binary image (halftoning/error-diffusion), etc. Also, once the METRIC is calculated, in this or any other embodiment, it can be used not only to make a decision whether to apply or not apply a compression algorithm, but also to select which of a plurality of possible compression algorithms should be used. For example, in a practical implementation, CCITT G4 compression tends to provide a certain level of compression ratio with relatively short calculation time, while JBIG2 compression tends to provide a greater compression ratio but with a longer calculation time. Thus, depending on the overall requirements of a larger system, a decision can be made to compress the data set according to a first compression algorithm, such as CCITT G4, if the METRIC is in a first range, and according to a second compression algorithm, such as JBIG2, if the METRIC is in a second range.

Figure 2:
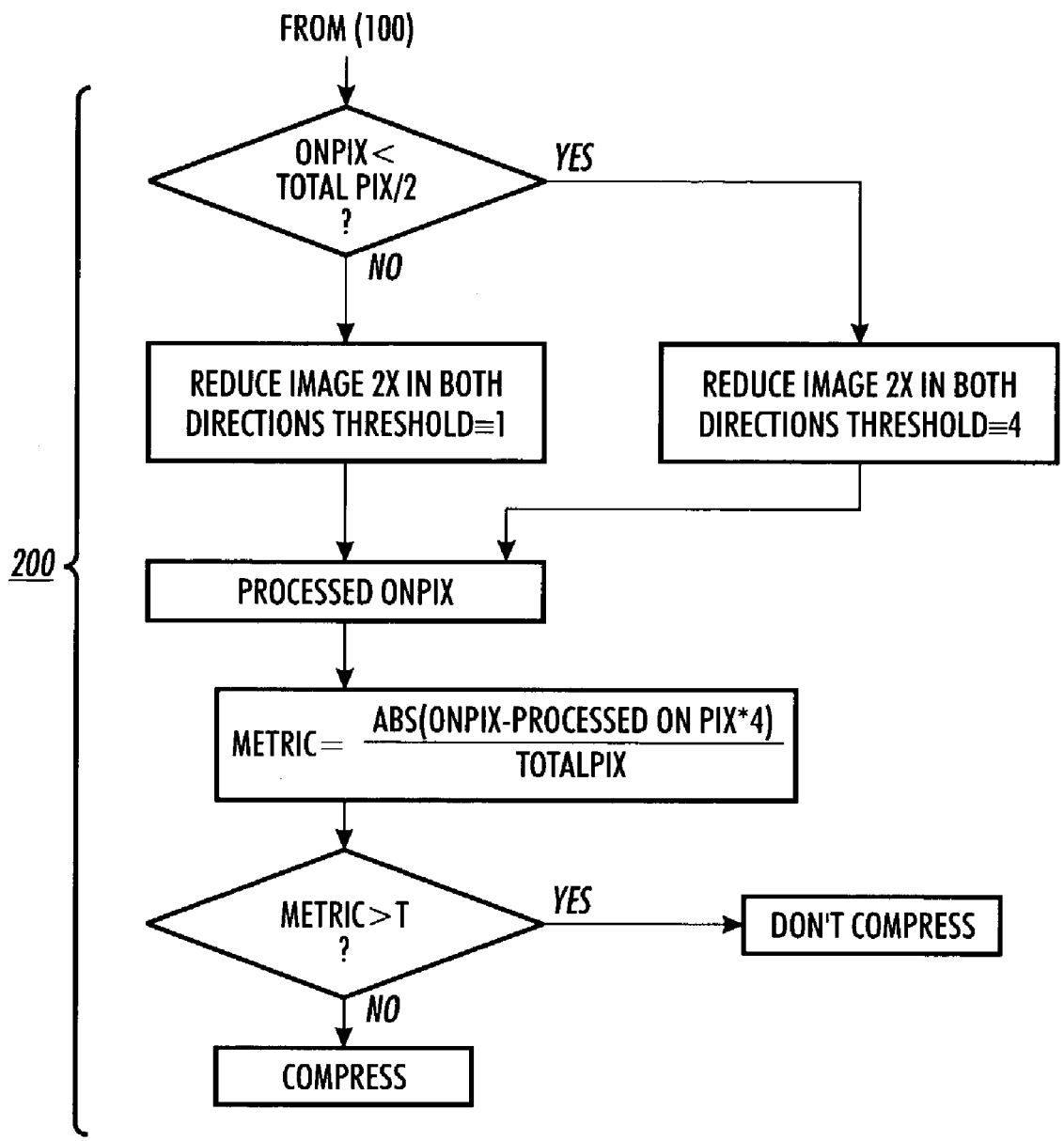
FIG. 2 is a flow-chart of an alternate method for analyzing an image data set.

FIG. 2 is a flowchart showing an alternate second stage of the method shown in FIG. 1, i.e., the stage shown as 200 in FIG. 2 can be used instead of the stage 102 in FIG. 1. Instead of the opening and closing operations of the FIG. 1 embodiment, the method of FIG. 2 uses a simpler method to make a determination of whether to apply the compression algorithm. In the FIG. 2 method, the original image data set is reduced 2× in both directions. In other words, the original image data is sampled as a series of 2×2 pixel windows, and each 2×2 pixel window is converted to one processed pixel in a reduced or processed image. If, in the original image data set, ONPIX<TOTALPIX/2, the 2×2 window is turned into one "processed on-pixel" only if all four of the pixels in the 2×2 window are on-pixels (threshold=4 or T4). (This thresholding of a number of on-pixels in a window can be considered a type of "morphological operation," for present purposes.) If, in the original image data set, ONPIX is not <TOTALPIX/2, the 2×2 pixel window is turned into a "processed on-pixel" if at least one of the pixels in the 2×2 pixel window is an on-pixel (threshold=1 or T1). This technique is a simpler version of the morphological operations of the FIG. 1 method, but yields comparably accurate results with less required computation time. The PROCESSEDONPIX resulting from these operations are then counted, multiplied by four to re-scale the processed image for comparison to the original image, and then the METRIC is calculated and a compression decision is made, in the same manner as with the FIG. 1 method described above.

Figure 3:
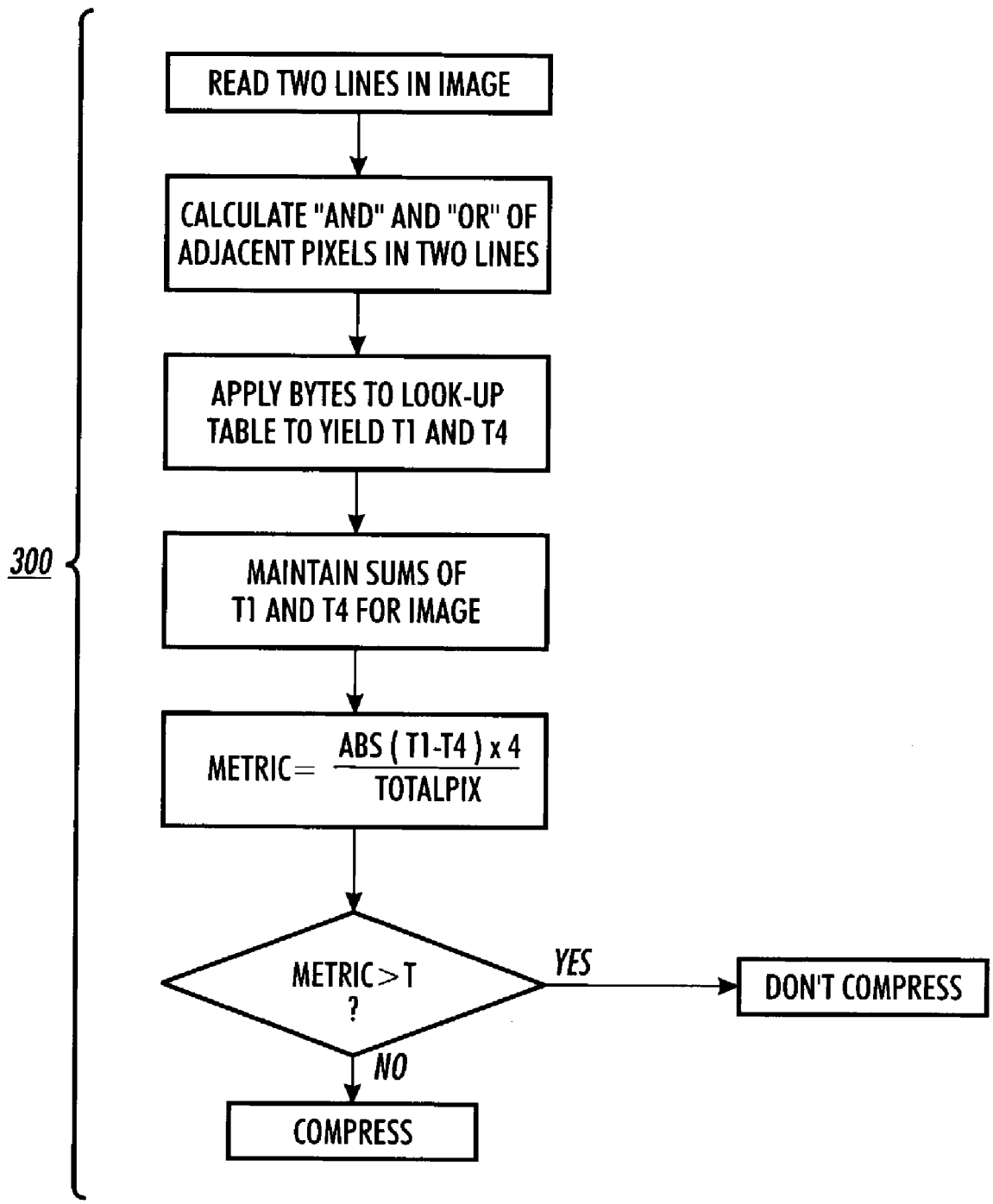
FIG. 3 is a flow-chart of an alternate method for analyzing an image data set.

FIG. 3 is a flowchart showing another embodiment; once again the steps shown as 300 can be substituted for the steps shown as 100 and 102 in FIG. 1 or 200 in FIG. 2. The FIG. 3 method is, similar to the method shown in FIG. 2 (i.e., making use of analyzing a series of 2×2 pixel windows in the image data set), but adapted for faster implementation by calculating the two thresholded outputs T1 & T4 simultaneously using simpler real-time calculation. In this method, two lines along one dimension of the image, such as would be available as raw data from an input scanner, are read and the values in the adjacent pixels therein are compared: simultaneously, each pair of pixels are ANDed and ORed, yielding two results. An example of this is as follows. Consider two lines of pixels, corresponding to two adjacent lines in an image. For a set of eight pixels within each line, with on-pixels being 1 and off-pixels being 0, an example of the image data is

LINE 1: 1 1 0 0 0 1 0 0
LINE 2: 1 1 0 1 0 1 0 1

For these pixels, a corresponding pair from each line (that is, each pixel in line 1 and the pixel in the same position in line 2) is ANDed and ORed, yielding two bytes of data, which in turn can be summarized as decimal or hex numbers:
AND: 1 1 0 0 0 1 0 0=196 decimal
OR: 1 1 0 1 0 1 0 1=213 decimal The decimal or hex numbers representing the bytes can readily be applied to a look-up table (LUT), as shown in FIG. 3, which can translate the two numbers into, in effect, a reduction of the four 2×2 windows in the original two lines of data above. The output of the look-up table would be a series of "processed pixels," with one processed pixel per each 2×2 set of pixels in the original image data set, exactly as with the FIG. 2 embodiment. Each consultation of the look-up table, in this embodiment, results in the processing of four 2×2 windows of the original image data set. For example, in the above example, the output of the two LUTs would be as follows:
T4LUT [196]=1
T1LUT [213]=4

In this way, over an entire document, a count of processed on-pixels can be made by accumulating the processed on-pixels counted out by the look-up table while the method of FIG. 3 goes through the image data set. The number of processed pixels which are on as a result of one pixel in the 2×2 window being on can be called T1, while processed pixels which are on as a result of all four pixels in the 2×2 window being on can be called T4. The METRIC used in this embodiment has been simplified to make use of just T1 and T4 values without having to calculate the original ONPIX count, thus eliminating one additional step involved in the earlier two embodiments. This METRIC is defined as an absolute difference between T1 and T4, multiplied by four, as a proportion of the TOTALPIX in the data set. Once the METRIC is calculated, the compression decision is made in the same manner as with the FIG. 2 method described above.

The invention claimed is:

1. A method of analyzing an image data set, comprising:
determining a number of on-pixels in the image data set;
performing a morphological operation on the image data set, yielding a processed image data set including processed on-pixels;
deriving a metric from a relationship between a number of on-pixels in the image data set and a number of processed on-pixels in the processed image data set; and
using the metric to estimate a compression performance associated with the image data set.

2. The method of claim 1, further comprising
deciding to apply a compression algorithm to the image data set if the metric is of a predetermined relationship to a threshold metric.

3. The method of claim 1, further comprising
deciding to apply a first compression algorithm to the image data set if the metric is of a first predetermined relationship to a first threshold metric, and deciding to apply a second compression algorithm to the image data set if the metric is of a predetermined relationship to a second threshold metric.

4. The method of claim 1, the morphological operation including opening.

5. The method of claim 1, the morphological operation including opening if the proportion of on-pixels to all pixels in the image data set is less than a predetermined threshold.

6. The method of claim 1, the morphological operation including closing.

7. The method of claim 1, the morphological operation including closing, if the proportion of on-pixels to all pixels in the image data set is more than a predetermined threshold.

8. The method of claim 1, the morphological operation including deriving, for each of a plurality of windows, each window including a plurality of pixels in the image data set, a processed pixel, the processed pixel being a processed on-pixel if there exist a predetermined threshold number of on-pixels in the window.

9. The method of claim 8, wherein each window is a 2×2 pixel window in the image data set.

10. The method of claim 8, wherein the predetermined threshold number of on-pixels is at least half the number of pixels in the window.

11. The method of claim 8, wherein the predetermined threshold number of on-pixels is all pixels in the window.

12. The method of claim 8, wherein the predetermined threshold number of on-pixels is less than half the number of pixels in the window if a total number of on-pixels is less than a predetermined proportion of total pixels in the image data set and the predetermined threshold number of on-pixels is at least half the number of pixels in the window if the total number of on-pixels is more than the predetermined proportion of total pixels in the image data set.

13. The method of claim 8, further comprising
(a) considering a first pixel in a first line of the image data set in the window and a second pixel in a second line of the image data set adjacent to the first pixel in the window;
(b) performing an AND operation and an OR operation on the first pixel and the second pixel, yielding an AND result and an OR result; and
(c) applying the AND result and the OR result to a look-up table, yielding an output related to determining a number of on-pixels in the window.

14. The method of claim 13, further comprising
performing steps (a–c) for each of a plurality of windows in the image data set.

* * * * *